(12) United States Patent
Crumly

(10) Patent No.: US 7,063,177 B1
(45) Date of Patent: Jun. 20, 2006

(54) WALK BEHIND MOWER

(75) Inventor: Ryan Crumly, Brock, NE (US)

(73) Assignee: Auburn Consolidated Industries, Inc., Auburn, NE (US)

( * ) Notice: Subject to any disclaimer, the term of this patent is extended or adjusted under 35 U.S.C. 154(b) by 99 days.

(21) Appl. No.: 10/844,860

(22) Filed: May 13, 2004

Related U.S. Application Data

(60) Provisional application No. 60/488,533, filed on Jul. 18, 2003.

(51) Int. Cl.
*B62D 51/04* (2006.01)

(52) U.S. Cl. ................ 180/6.48; 180/19.1; 56/11.1

(58) Field of Classification Search .............. 180/6.48, 180/6.32, 19.1; 56/10.8, 11.1; 74/525
See application file for complete search history.

(56) References Cited

U.S. PATENT DOCUMENTS

| | | | |
|---|---|---|---|
| 3,459,273 A | 8/1969 | Leinhauser et al. | |
| 3,605,519 A | 9/1971 | Heggen | |
| 3,616,869 A | 11/1971 | Rilling | |
| 3,702,051 A | 11/1972 | Deines | |
| 4,036,321 A | 7/1977 | Habiger | |
| 4,078,449 A | 3/1978 | Kelly | |
| 4,369,855 A | 1/1983 | Buschbom et al. | |
| 4,490,710 A | 12/1984 | Kopsho, Jr. et al. | |
| 4,589,249 A | 5/1986 | Walker et al. | |
| 4,955,249 A | 9/1990 | Wetor | |
| 4,967,543 A | 11/1990 | Scag et al. | |
| 4,991,382 A * | 2/1991 | Scag ........................... | 56/10.9 |
| 5,020,308 A | 6/1991 | Braun et al. | |
| 5,042,238 A | 8/1991 | White, III et al. | |
| 5,062,316 A | 11/1991 | Lykken et al. | |
| 5,077,959 A | 1/1992 | Wenzel | |
| 5,080,209 A | 1/1992 | Yurko | |
| 5,127,215 A | 7/1992 | Wenzel | |
| 5,137,100 A | 8/1992 | Scott et al. | |
| 5,205,181 A | 4/1993 | Wright | |
| 5,228,360 A | 7/1993 | Johnson | |
| 5,247,784 A | 9/1993 | Kitamura et al. | |
| 5,301,568 A | 4/1994 | Kono | |
| 5,488,818 A | 2/1996 | Powers et al. | |
| 5,727,426 A | 3/1998 | Lykken et al. | |
| 5,791,200 A | 8/1998 | Papasideris | |
| 5,822,961 A | 10/1998 | Busboom | |
| 5,848,520 A | 12/1998 | Arfstrom et al. | |

(Continued)

*Primary Examiner*—Tony Winner
(74) *Attorney, Agent, or Firm*—Dicke, Billig & Czaja

(57) ABSTRACT

A walk behind mower includes an engine-driven transmission for driving a pair of wheels at rate that varies according to the position of a transmission setting control selected by an operator. The transmission setting control positions a member that has a stop surface proximate to a transmission speed input on the transmission. The transmission speed input is adjusted by one or more levers on a handle of the mower. The transmission setting control is adjusted to define a home position of the stop surface relative to the transmission speed input and define a range of travel of the transmission speed input before it contacts the stop surface. The member is spring biased toward the home position but is moveable away from the home position. The position of the transmission speed input when it contacts the stop surface defines a first rate of travel of the transmission. An operator applies a first amount of force to the lever until the transmission speed input contacts the stop surface. The operator can apply a second greater amount of force to the lever that exceeds the spring biasing force on the member to further move the transmission speed input to define a second higher rate of travel of the transmission.

22 Claims, 14 Drawing Sheets

U.S. PATENT DOCUMENTS

| | | |
|---|---|---|
| 6,082,083 A | 7/2000 | Stalpes et al. |
| 6,161,637 A | 12/2000 | Decker et al. |
| 6,640,526 B1 * | 11/2003 | Velke et al. .................. 56/10.8 |
| 6,644,002 B1 * | 11/2003 | Trefz ........................... 56/10.8 |
| 6,935,446 B1 * | 8/2005 | Walker ...................... 180/6.48 |
| 6,951,092 B1 * | 10/2005 | Busboom et al. ............. 56/10.8 |
| 6,968,687 B1 * | 11/2005 | Poplawski et al. ............ 60/487 |
| 2002/0014063 A1 | 2/2002 | Velke et al. |
| 2002/0116922 A1 | 8/2002 | Abend et al. |
| 2003/0010007 A1 | 1/2003 | Wright et al. |

* cited by examiner

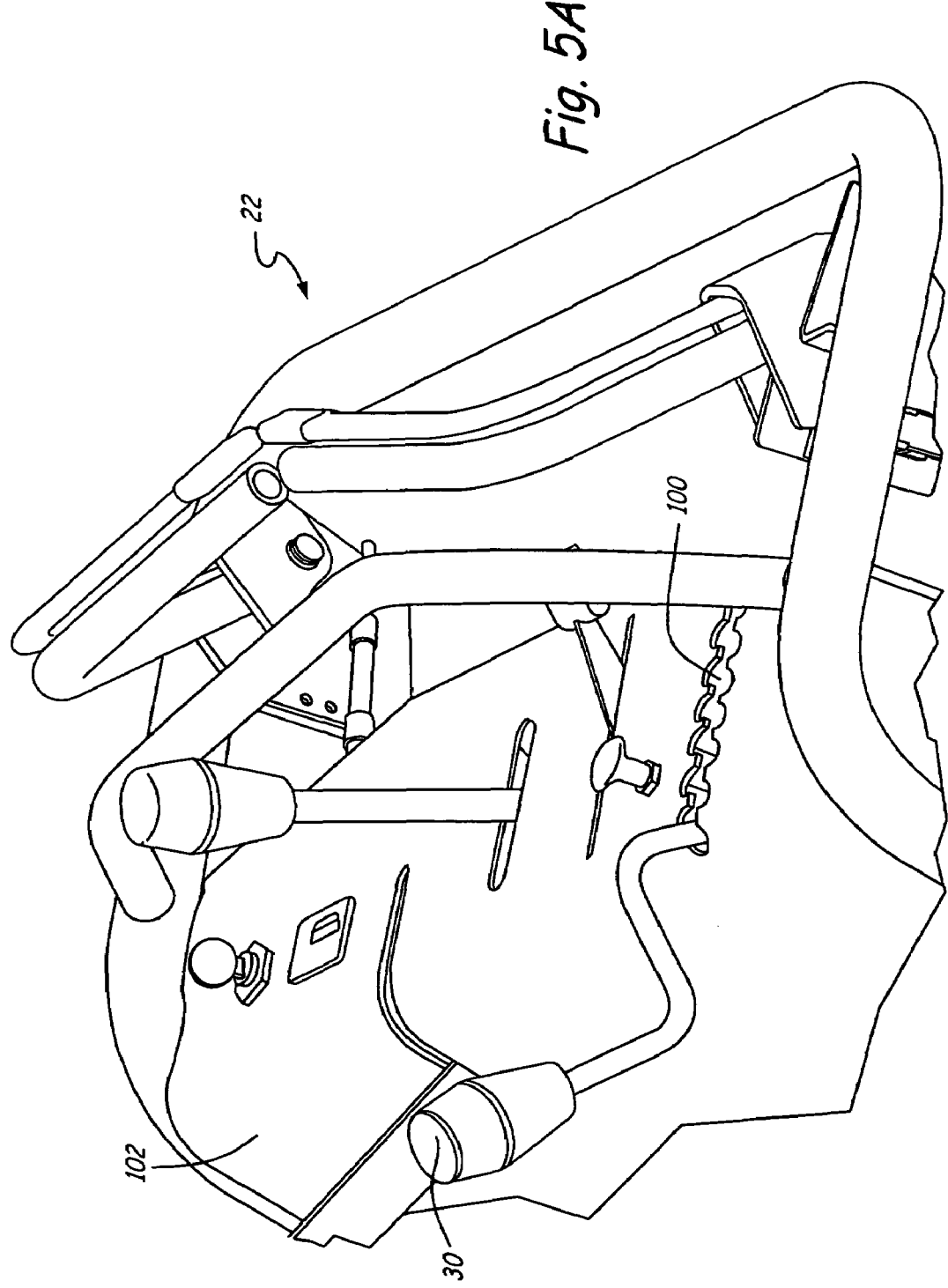

WALK BEHIND MOWER

CROSS-REFERENCE TO RELATED APPLICATION(S)

Priority is claimed under U.S. Provisional Application No. 60/488,533, entitled Walk Behind Mower, and filed Jul. 18, 2003, which is incorporated herein by reference in its entirety.

BACKGROUND OF THE INVENTION

The present invention relates to mowers with mechanisms for adjusting drive speed. In particular, the present invention relates to mowers with an independent transmission for each of two rear drive wheels.

Adjustment of the deck height determines the amount of vegetation that is cut. For example, at golf courses, the fairways are mowed at a much shorter deck height than are the rough or out of bounds. It is also advantageous to be able to adjust the deck height setting on mowers used by homeowners as grass height preferences tend to vary between owners and additionally it is often necessary to adjust the deck height depending on the terrain that is to be mowed. Sloped and uneven ground often requires the use of a higher deck height than level ground. Adjustments of the deck height for walk behind mowers is time consuming. The adjustment requires the engine of the mower to be shut off and, in some cases, manual adjustments of each corner of the deck must be made.

With respect to the rate of travel of the mower, the speed is a function of a transmission control that varies the rate at which the drive wheels are driven by the transmission. Hydrostatic transmissions, for example, are one type of transmission known in the art and include fluid pumps driven by the mower engine, and a hydraulic motor for transforming the hydraulic power into torque and rotation speed for operating the wheels. Once the transmission control is adjusted to a desired rate of travel, the operator activates one or more levers on the mower to engage the transmissions. The operator then operates the mower at the operating speed selected. At the end of a cutting pass, the mower is steered to a new cutting direction by operating only one of the hydrostatic drives of the rear wheels. If the mower is to be driven at a higher rate of speed, such as is desirable when moving the mower from one area to a more distant area, the mower is stopped by releasing both transmission engagement levers, readjusting the transmission rate control, and then reengaging the transmission engagement levers.

As time and efficiency are important factors in mowing, improvements in deck height adjustment and drive speed adjustment are needed in mowers.

BRIEF SUMMARY OF THE INVENTION

In one embodiment, the present invention is a walk behind power mower that can be operated at a first speed determined by the operator and a second speed greater than the first speed without having to adjust a transmission speed setting of the mower. The mower includes an operator handle and a lever on the operator handle that moves between a starting position and a second position.

The lever is operably connected to a transmission speed input which rotates to vary the rate of speed of the transmission. The transmission is in neutral when the lever is in the starting position and the transmission is at a highest rate of speed when the lever is in the second position.

A first member is connected to the transmission speed input and rotates therewith. A second member has a stop surface that engages the first member when the first member contacts the stop surface. The second member is biased toward a home position near the first member and is moveable away from the home position.

In operation, an operator applies a first amount of force to the lever to move the lever away from the starting position. In response, the first member rotates and engages the stop surface before the lever can move to the second position, thereby defining a first rate of speed of the transmission. The operator applies a second amount of force to the lever to move it toward the second position. The further movement of the lever causes further rotation of the first member and movement of the second member away from the home position to permit a second higher rate of speed of the transmission.

BRIEF DESCRIPTION OF THE DRAWINGS

FIG. 5A is an enlarged view of the deck height setting cam of the present invention.

DETAILED DESCRIPTION

Figure 1:
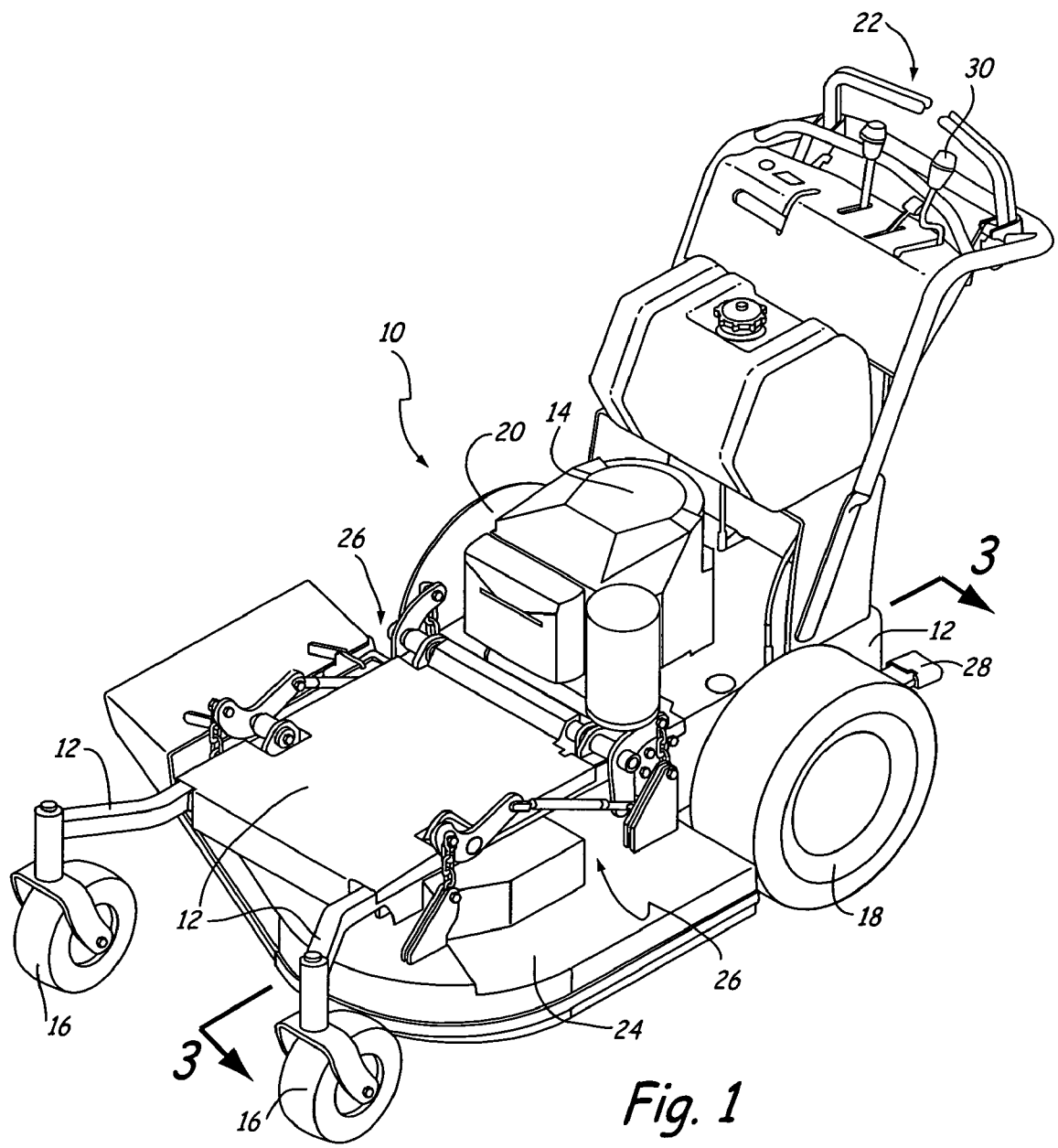
FIG. 1 is a front perspective view of the mower of the present invention.

FIG. 1 is a perspective view of one embodiment of a mower of the present invention, generally referred to as mower 10. Mower 10 is a walk-behind lawn mower that provides both a rapid and efficient system for adjusting the height of deck 24 and an advantageous drive system. As illustrated in FIG. 1, mower 10 generally includes frame 12, engine 14, front wheels 16, left rear wheel 18, right rear wheel 20, handle 22, deck 24, lifting mechanism 26, and foot pedal 28. The designated left and right identifiers refer to components generally viewed from the perspective of an operator operating mower 10.

Frame 12 carries engine 14, which provides power for various mower operations, and handle 22, which supports various controls for mower 10, including a deck height setting control 30. Herein, the term "mower body" generally refers to frame 12 along mower 10, as illustrated in FIG. 1. Deck 24 is supported beneath frame 12 and houses one or more cutting blades that are driven by engine 14. Frame 12 is supported by front wheels 16, left rear wheel 18, and right rear wheel 20. Left rear wheel 18 and right rear wheel 20 are each driven by its own hydrostatic transmission in a manner known in the art. Deck 24 is further associated with lifting mechanism 26, which raises and lowers deck 24. Lifting mechanism 26 is linked to foot pedal 28, which is located at the rear of mower 10.

When an operator desires to adjust the height of deck 24, the operator depresses foot pedal 28, which operates lifting mechanism 26 to raise deck 24. The operator then sets the desired height of deck 24 via deck height setting control 30. The operator then releases foot pedal 28, which allows lifting mechanism 26 to lower deck 24 down until deck 24 reaches the selected height. As such, mower 10 reduces the time and effort required to adjust the height of deck 24, as compared to standard commercial mowers, and provides a safe way to adjust the height of deck 24 without having to shut down engine 14. This allows the operator to mow areas with uneven ground or that require different length cuts much quicker, which saves time, energy, and money.

Figure 2:
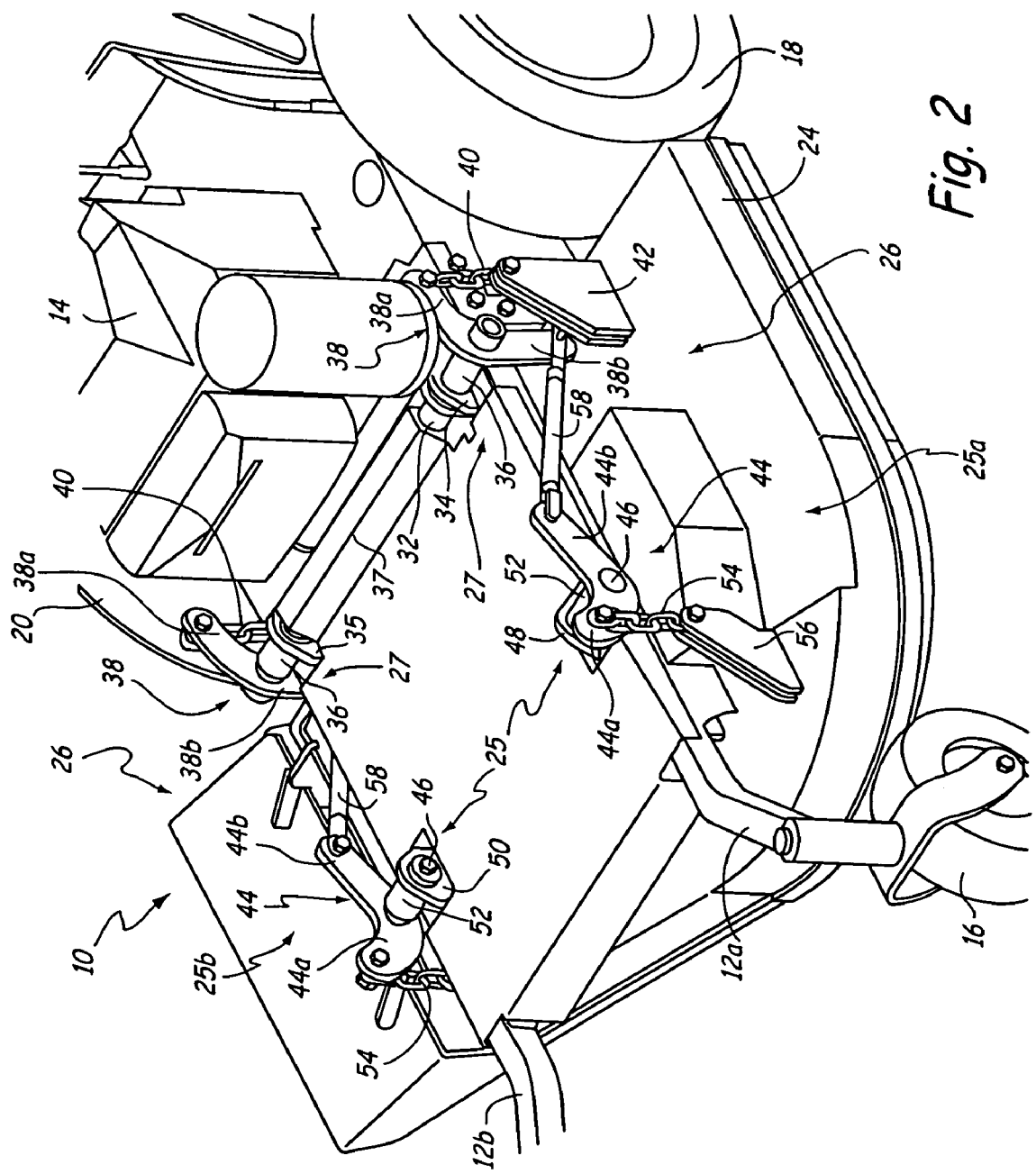
FIG. 2 is an enlarged partial perspective view of the lift mechanism for the mower of the present invention.
Figure 2A:
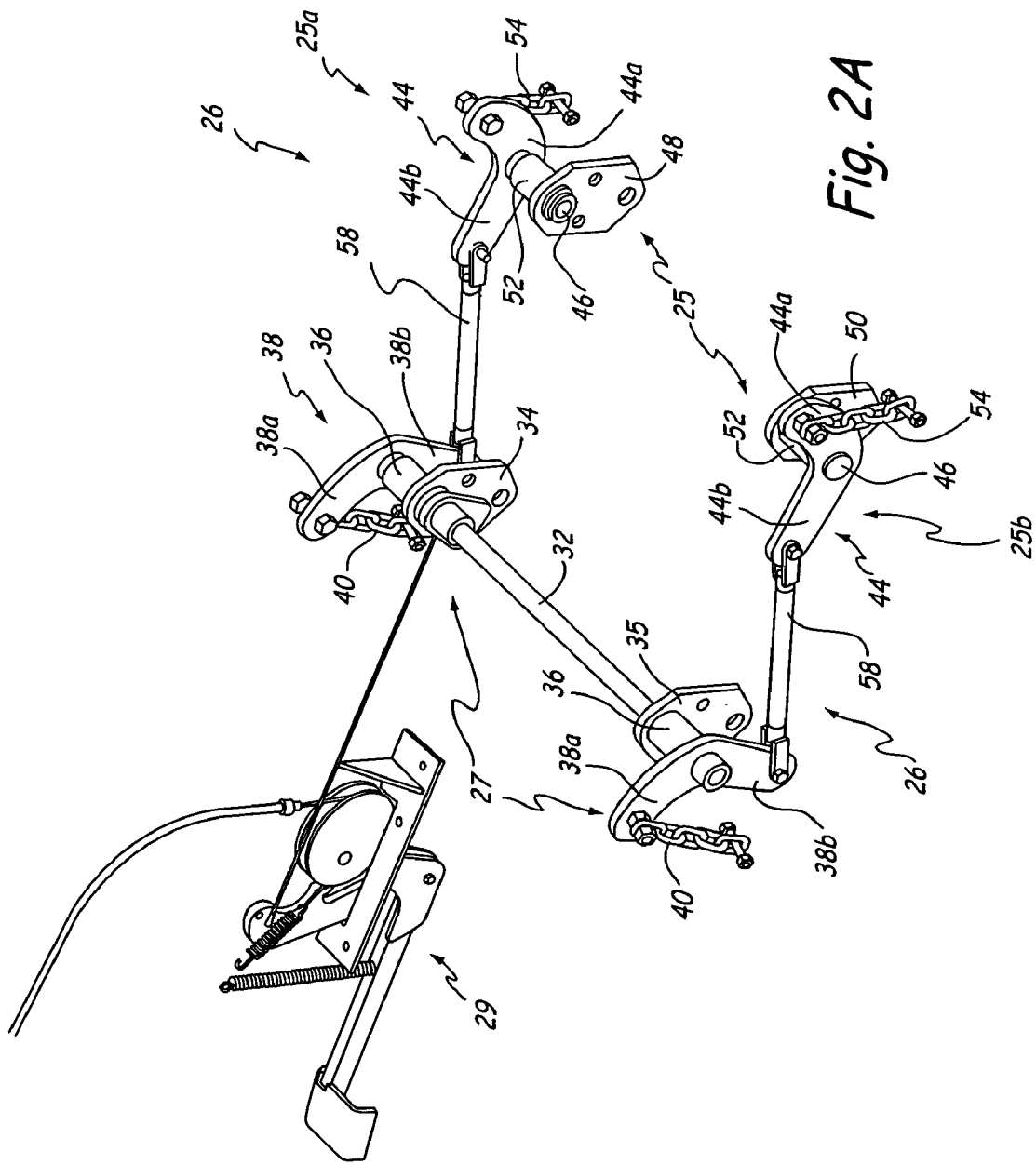
FIG. 2A is a perspective view of the lift mechanism for the mower of the present invention with the mower deck removed.

FIG. 2 is an enlarged partial perspective view of mower 10 illustrating the lifting mechanism 26 for the deck 24. FIG. 2A is a perspective view of the lifting mechanism 26 with the deck 24 removed, in which the lifting mechanism 26 connected to a deck height adjustment apparatus 29. As shown in FIGS. 2 and 2A, the lifting mechanism 26 is comprised of a front lift assembly 25 and a rear lift assembly 27 that is supported between a left frame member 12a and a right frame member 12b. The rear lift assembly 27 includes a shaft 32 that is supported for rotational movement by the rear mounting members 34 and 35 secured to the left and right frame members 12a, 12b, respectively. As shown in FIG. 2, a central portion of the shaft 32 is covered by a shroud 37. Each end of the shaft 32 is connected to the apex of a curved arm 38, having angularly displaced first and second portions 38a and 38b. Curved arms 38 are spaced from the mounting members 34, 35 by spacers 36.

The first portions 38a of curved arms 38 are connected to chains 40 that are in turn secured to brackets 42 mounted to the top of the deck 24. As viewed in FIG. 2, counterclockwise rotation of shaft 32 results in an elevation of first portions 38a and a raising of the rear portion of deck 24.

The front lift assembly 25 comprises a left lift mechanism 25a and a right lift mechanism 25b, which cooperate with the rear lift assembly 27 to provide a coordinated lifting of deck 24. The left and right lift mechanisms 25a, 25b each comprise a curved arm 44 carried by an axle 46 rotationally mounted to front mounting members 48 and 50 that are secured to frame members 12a, 12b. Curved arms 44 are spaced from front mounting members 48, 50 by spacers 52 so that the curved arms 72 of the front lift assembly 25 are longitudinally aligned with the curved arms of the rear lift assembly 27. Like curved arms 38 of the rear lift assembly 27, curved arms 44 have angularly displaced first and second portions 44a and 44b. The first portions 44a are secured to chains 54 that connect to mounting brackets 56 attached to the front of deck 24. As viewed in FIG. 2, a clockwise rotation of axles 46 results in an elevation of the first portion 44a of each curved arm 44 and a consequent lifting of the front of deck 24. The lifting action of the front and rear lifting assemblies 25, 27 is coordinated by linking rods 58, which are pivotally connected between the second portions 38b of curved arms 38 and the second portions 44b of curved arms 44.

Figure 3:
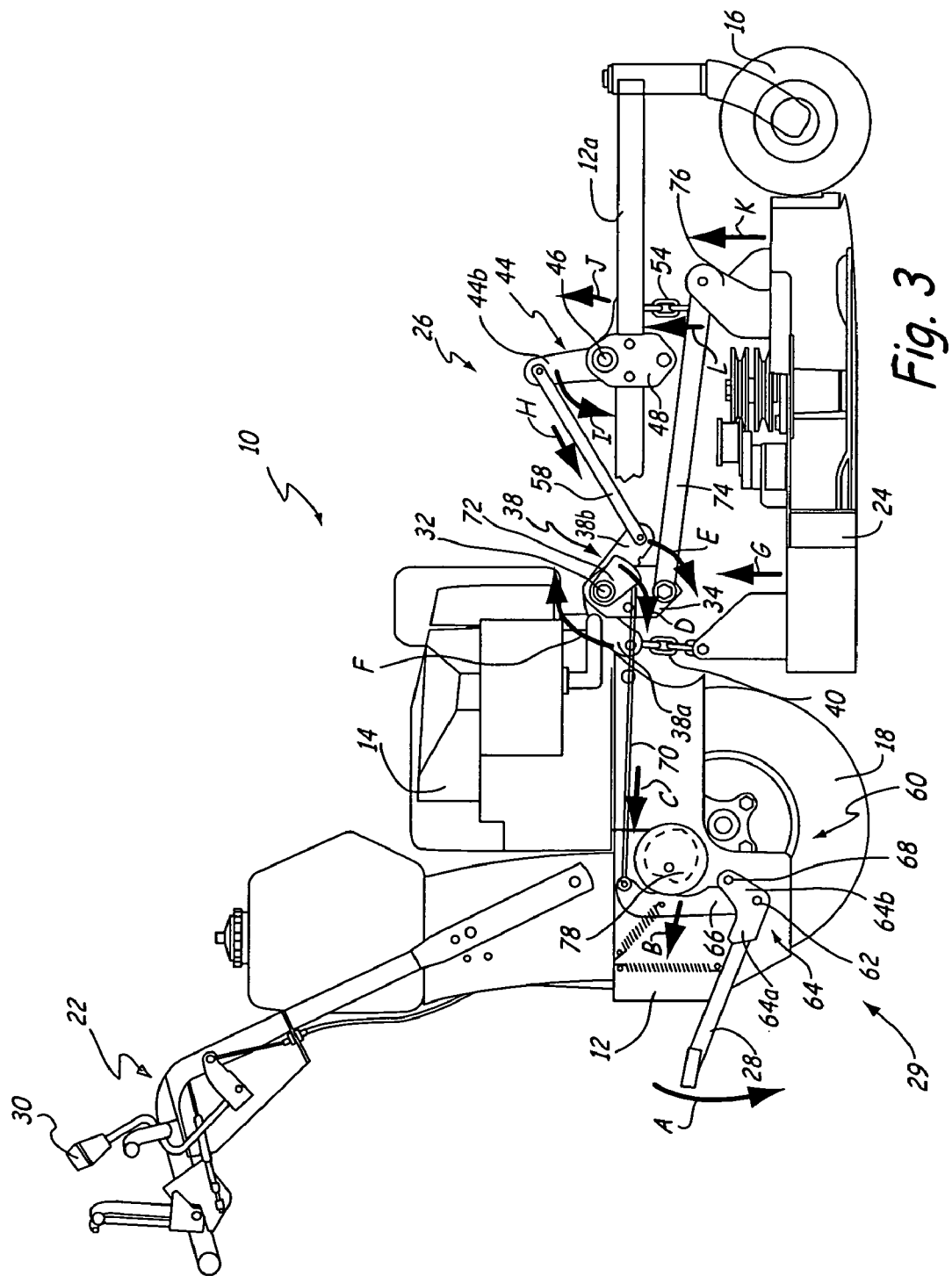
FIG. 3 is a sectional view taken along line A—A in FIG. 1.

FIG. 3 is a cross-sectional view of mower 10 taken along line 3—3 of FIG. 1. As shown in FIG. 3, lift mechanism 26 is connected to a deck height adjustment apparatus 29, which includes foot pedal assembly 60, lever 66, linking member 70, and deck height adjustment cam 78. Lift mechanism 26 is actuated by foot pedal assembly 60, which includes a pivotal connection 62 to a portion of frame 12. Foot pedal assembly 60 comprises foot pedal 28, which is secured to curved arm 64 having a rearward extending portion 64a and a forward extending portion 64b, with the pivotal connection 62 formed at the apex of curved arm 64. Pivotal connection 64 also secures one end of lever 66 relative to curved arm 64. The forward extending portion 64b is provided with a peg 68 which bears against lever 66 when pedal 28 is depressed to move lever 66 in a rearward direction. The opposite end of lever 66 is connected to linking member 70 that in turn is connected to a rotation plate 72 connected to shaft 32.

FIG. 3 illustrates the lifting mechanism 26 and the deck height adjustment apparatus 29' where deck 24 is resting at a low height setting. Deck 24 is raised initially by depressing foot pedal 28, as illustrated by arrow A, which rotates curved arm 64 counterclockwise. Peg 68 on the forward extending portion 64b of curved arm 64 engages lever 66 and urges lever 66 toward the rear of mower 10, as illustrated by arrow B. This correspondingly pulls linking member 70 toward the rear of mower 10, as illustrated by arrow C, which pivots rotation plate 72 and shaft 32 in a clockwise direction, as illustrated by arrow D. The clockwise rotation of shaft 32 causes curved arms 38 to pivot in a clockwise direction, as illustrated by arrows E and F. The clockwise pivoting of curved arms 38 lifts first portions 38a, which correspondingly lift chains 40 and the rear portion of deck 24, as illustrated by arrow G. The clockwise pivoting of rear deck arms 38 also pull second portions 38b downward, which pulls linking rods 58 toward the rear of mower 10, as illustrated by arrow H.

The rearward movement of linking rods 58 pivot curved arms 44 counterclockwise, as illustrated by arrows I and J, resulting in a downward movement of second portions 44b, as illustrated by arrow I. The counter-clockwise pivoting of curved arms 44 lift first portions 44a of curved arms 44, which correspondingly lift: chains 54 and the front portion of deck 24, as illustrated by arrow K.

As deck 24 is raised and lowered, deck 24 is maintained in longitudinal alignment with mower 10 by a pair of guide arms 74 on each side of deck 24. Guide arms 74 have first ends pivotally connected to rear mounting members 34 and 35, and second ends pivotally secured to deck 24 by mounting brackets 76. Guide arms 74 provide additional connections between frame 12a, 12b, and deck 24 to inhibit horizontal swinging motion, and allow deck 24 to be raised in alignment with the longitudinal axis of mower 10. As deck 24 is raised, guide arms 74 are also raised at the end connected to mounting brackets 76, as illustrated by arrow L.

Lifting mechanism 26 allows the operator to raise and lower deck 24 with little time and effort. Deck 24 is easily and conveniently raised and lowered by actuating foot pedal 28. The operator merely depresses foot pedal 28 to lift deck 24 to full height, and releases foot pedal 28 to allow deck 24 to lower down to the desired height. As will be described, the height of deck 28 may be varied by deck height adjustment cam 78 that is actuated by the deck height setting control 30 carried by handle 22 of mower 10. The deck height adjustment can be performed while mower 10 is still running and does not require the operator to stop mower 10 and adjust each corner of deck 24 to a new height.

Figure 4:
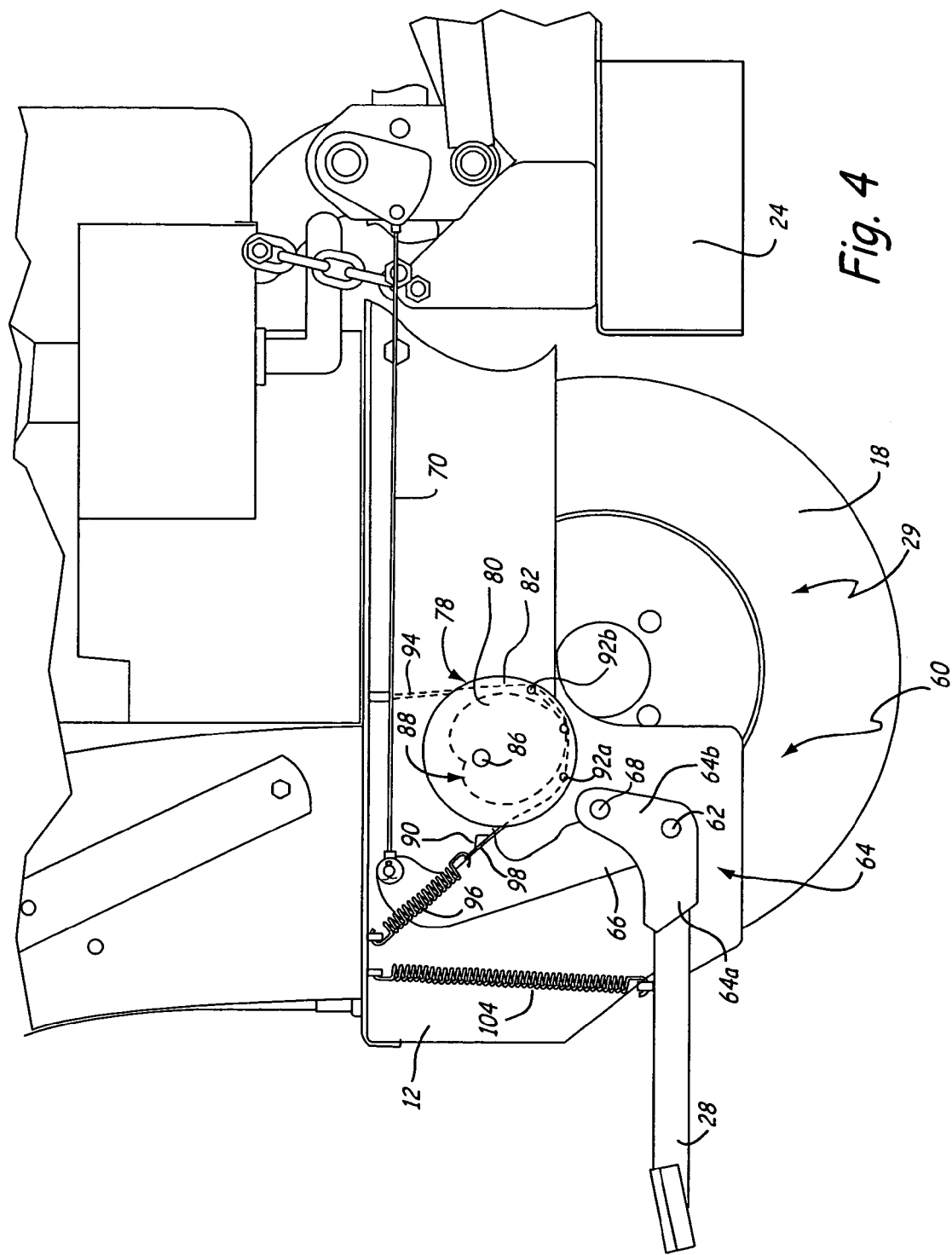
FIG. 4 is an enlarged view of the deck height setting mechanism of the present invention.
Figure 5:
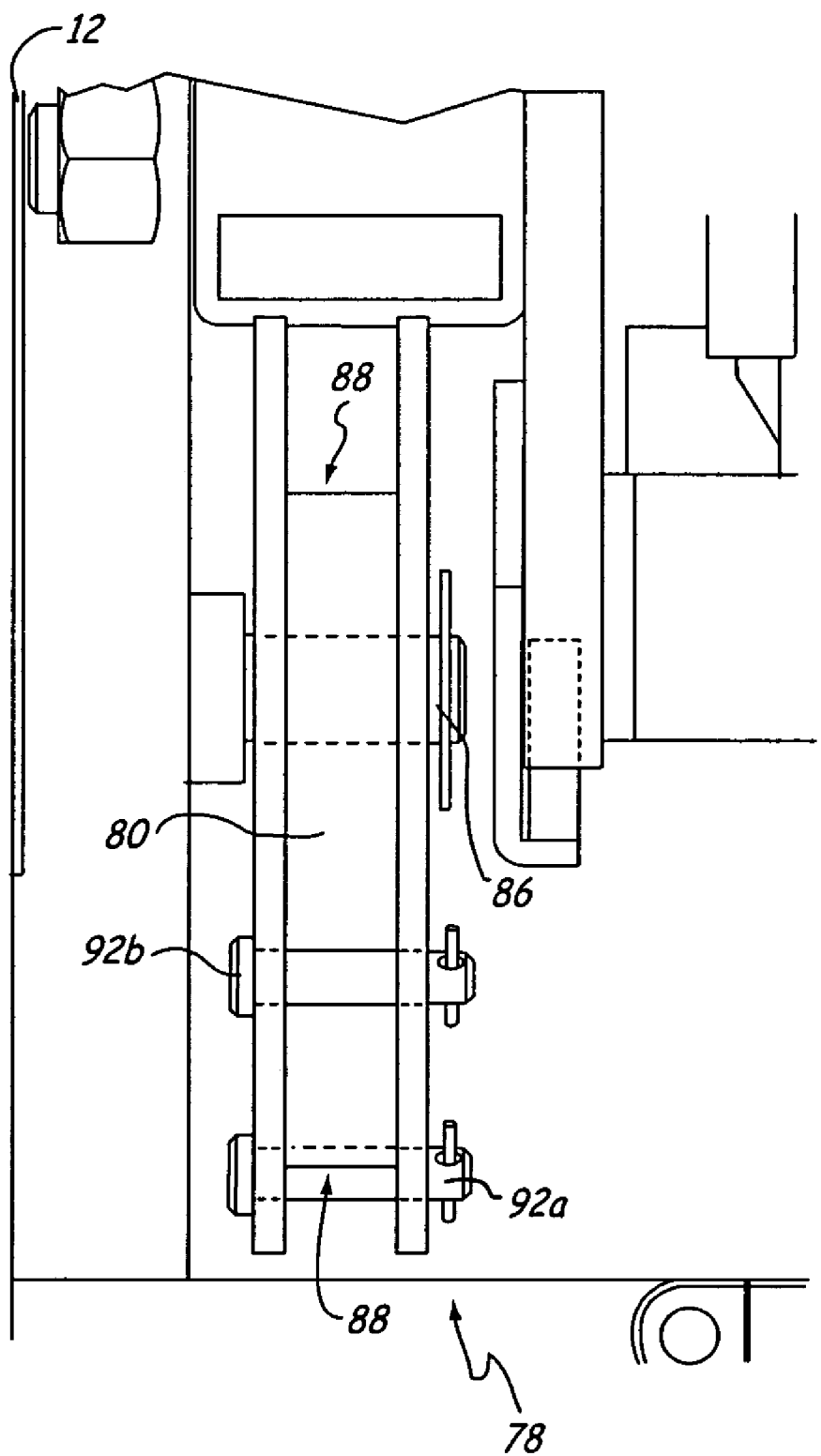
FIG. 5 is a rear view taken of the deck height setting cam of the present invention.

FIG. 4 is an enlarged view of the foot pedal assembly 60 of FIG. 3 with deck height setting cam 78, which is a rotational cam mechanism utilized for setting and maintaining a desired height of deck 24. As shown in FIGS. 4 and 5, deck height setting cam 78, which is comprised of a cam wheel 80 secured between opposing plates 82, 84 is provided with an eccentrically positioned axle 86 that is rotatably connected to frame 12. Cam wheel 80 has an outer edge surface 88 of a varying radius relative to axle 86 of the deck height setting cam 78, where axle 86 defines an axis of rotation of cam wheel 80. The outer edge surface 88 of cam wheel 80 is aligned for engagement with a protrusion 90 of lever 66 so that the range of forward movement of lever 66 is a function of the outer edge portion of cam wheel 80 oriented toward protrusion 90.

Deck height setting cam 78 is rotated by deck height control 30 on handle 22 (shown in FIG. 1). Any suitable mechanical actuator positioned relative to the handle 22, such as a pneumatic cylinder, a gas-filled cylinder, a ball screw, a chain drive, a rack, a worm gear, or an electric motor, may be used to rotate the cam wheel 80. In one embodiment, shown in FIGS. 4 and 5, deck height setting cam 78 includes a plurality of radially spaced pins 92 extending between the opposing plates 82, 84 generally adjacent to an edge portion of cam wheel 80 having the greatest radius. A deck height setting cable 94 controlled by deck height setting control 30 is connected to end pin 92a such that as deck height setting cable 94 extends (i.e., lengthens) relative to frame 12, cam wheel 80 rotates clockwise, and when the deck height setting cable 94 retracts (i.e., shortens) relative to frame 12, the cam wheel 80 rotates counterclockwise. A spring 96 connected by a cable 98 to pin 92b assists the deck height setting cam 78 in rotating clockwise when deck height setting cable 94 is extended. As shown if FIGS. 4 and 5, the plurality of radially spaced pins 92 define a curved shoulder. In an alternative embodiment, the curved shoulder may be a unitary wall structure extending between the opposing plates 82, 84.

The length of the deck height setting cable 94 is determined by the selected settings of deck height setting control 30 on handle 22. As illustrated in FIG. 5a, which is an enlarged view of handle 22, deck height setting control 30 extends through a slot 100 in panel 102 containing deck height setting notches for holding deck height setting control 30 at various positions along slot 100. The notches may be labeled to designate the incremental heights of deck 24. When deck height setting control 30 is shifted forward along the slot 100 toward the front of mower 10, as shown in FIG. 5A, deck height setting cable 94 extends from frame 12, allowing cam wheel 80 to rotate clockwise. Similarly, when deck height control 40 is shifted along the slot 100 toward the rear of mower 10, deck height setting cable 94 retracts to frame 12, allowing cam wheel 80 to rotate counterclockwise.

Figure 6:
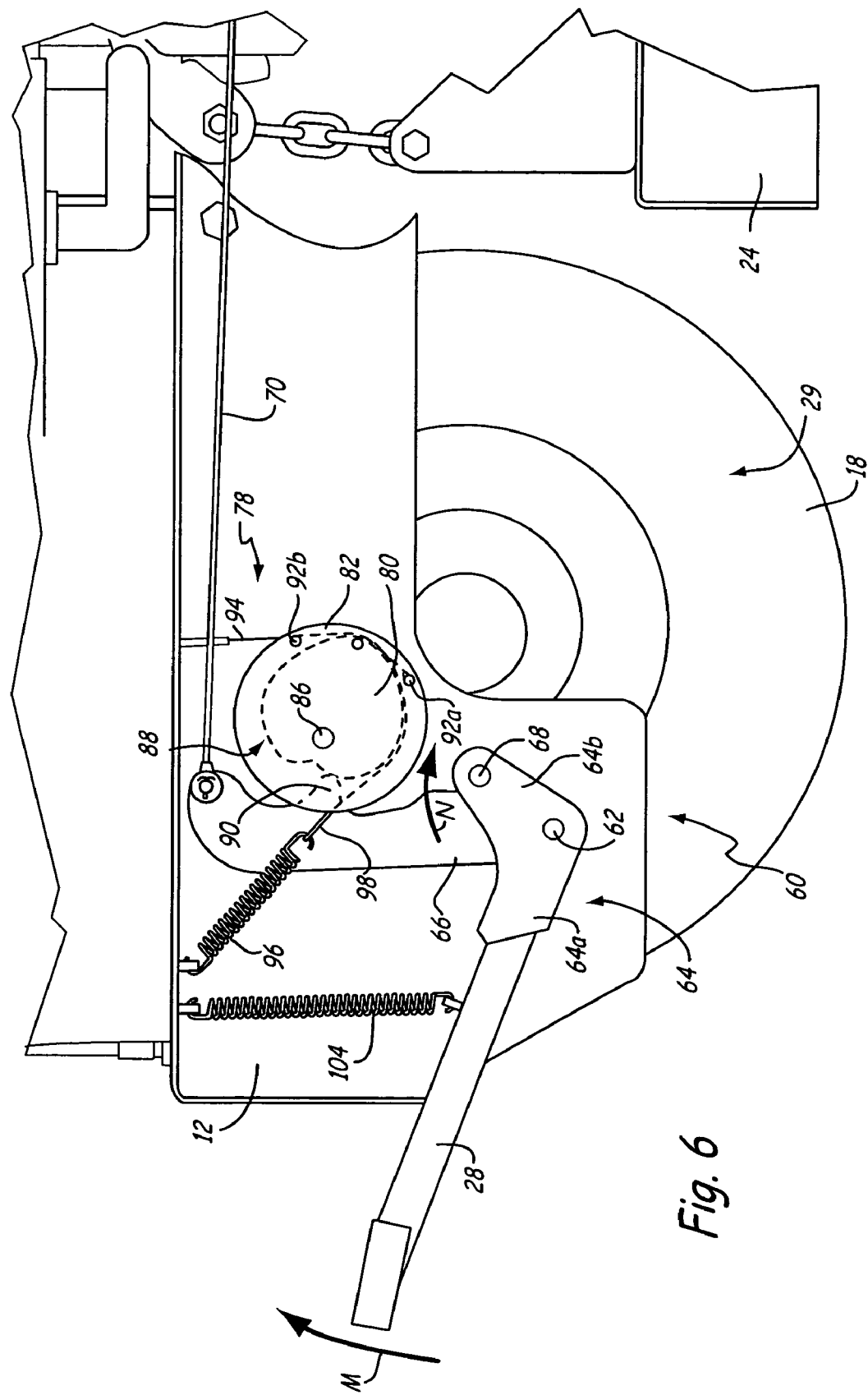
FIG. 6 is an enlarged view of the deck height setting mechanism of the present invention.

As shown in FIG. 4, with pedal 28 fully depressed, lever 66 is urged rearward and, as previously described, deck 24 is elevated. As shown in FIG. 6, when pedal 28 is released, a return spring 104 connected between pedal 28 and frame 12 urges pedal 28 to a raised position, as illustrated by arrow M. Foot pedal 28 returns to a position that is generally out of the way during normal use, but is ready to be depressed when needed. This accordingly allows lever 66 to travel forward in the direction of arrow N (and deck 24 lowers) until the protrusion 90 engages an edge portion of cam wheel 80. The height of deck 24 is thereby maintained according to the relative position of the deck height setting cam 78. As the radius of the outer edge 88 of cam wheel 80 oriented toward protrusion 90 increases by clockwise rotation of the deck height setting cam 78, the height at which deck 24 will be maintained increases. The deck height of mower 10 is thereby easily and quickly enabled by the deck height adjustment mechanism of the present invention.

Figure 7:
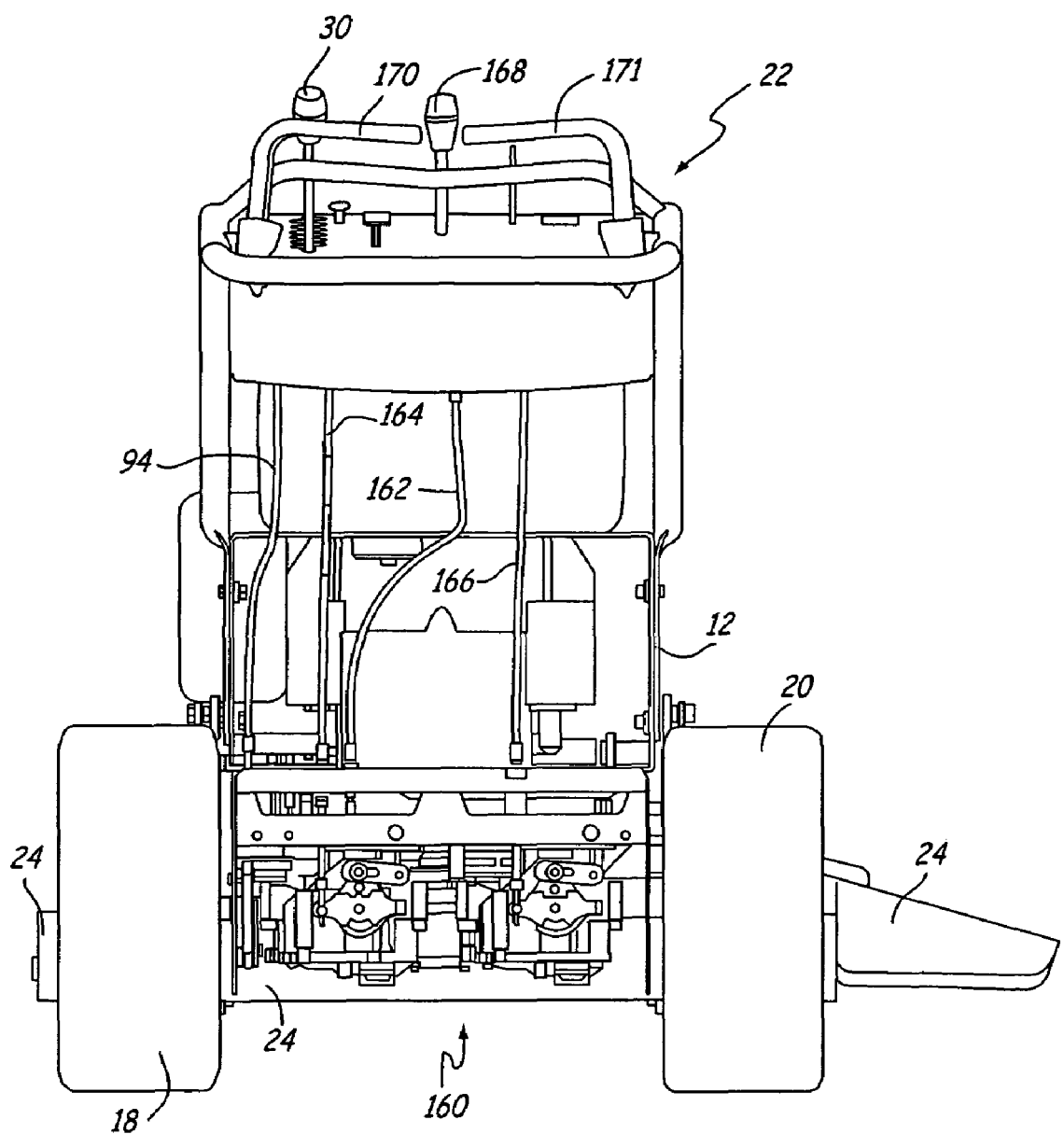
FIG. 7 is a rear view of the mower of the present invention.

FIG. 7 is a rear view of mower 10, with the lower rear portion of mower 10 exposed to illustrate transmission system 160. Transmission system 160 is supported in the rear portion of frame 12 of mower 10, is powered by engine 14, and comprises two hydrostatic transmission systems, generally referred to as 160a, 160b, for independently driving left rear wheel 18 and right rear wheel 20.

FIG. 7 further illustrates the cable connections extending from handle 22 to foot pedal assembly 60 and transmission system 160. Deck height setting cable 94 is connected to deck height setting control 30 and extends down to connect with foot pedal assembly 60, which is located adjacently to transmission system 160. Transmission setting cable 162 is connected to transmission setting control 168 and transmission system 160 for allowing transmission setting control 168 to set the standard operating speed of mower 10. Left and right transmission engagement cables 164 and 166 are connected to left and right engagement levers 170 and 171, respectively, and extend down to left and right transmission systems 160a and 160b, respectively.

Figure 8:
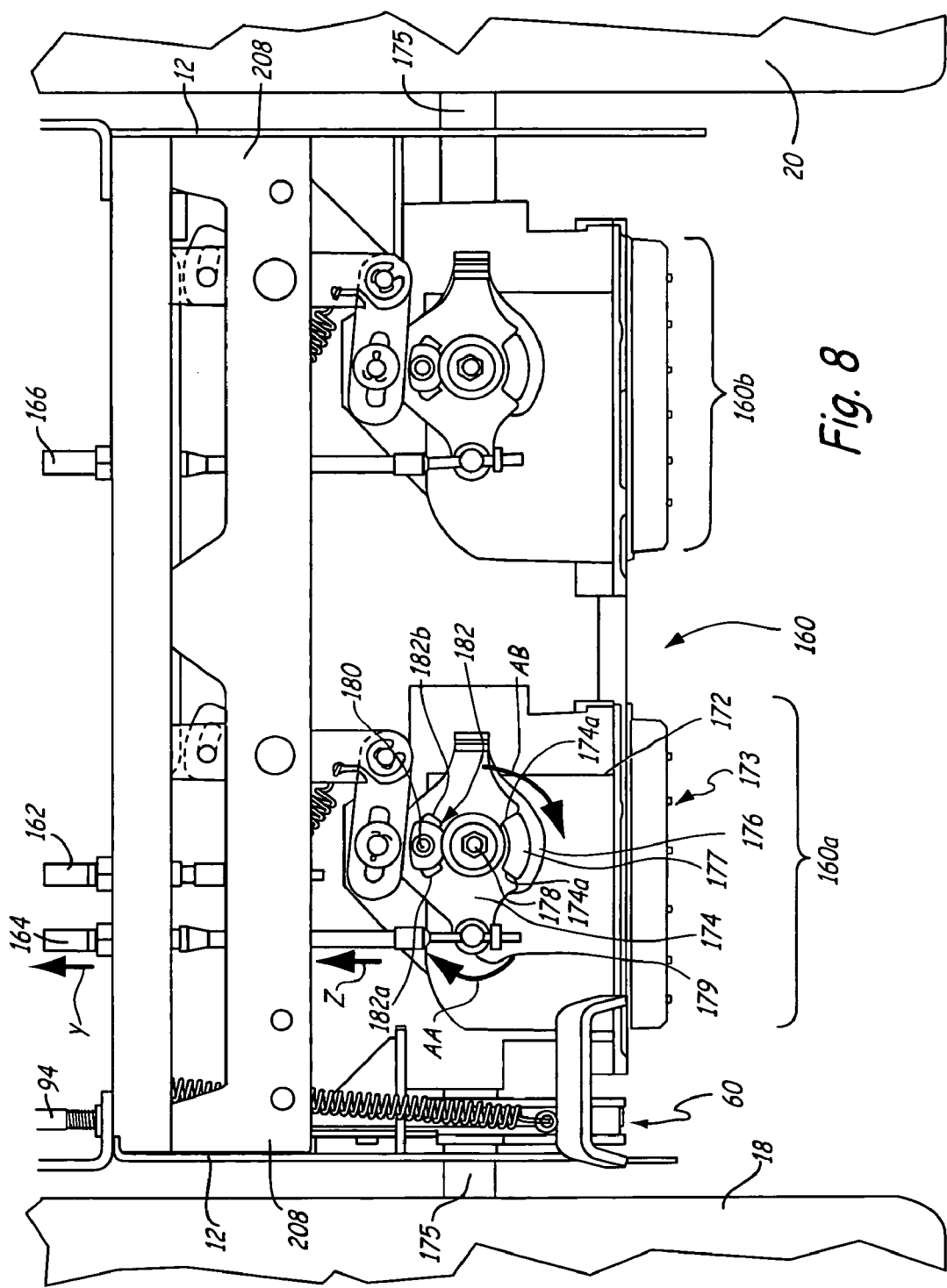
FIG. 8 is an enlarged rear view of mower 10 of the present invention.

FIG. 8 is an enlarged rear view of mower 10 showing an improved transmission system 160 of the present invention, which allows the operator to easily vary the rate at which wheels 18 and 20 are rotated from a first selected rate to a second higher rate. As shown in FIG. 8, transmission system 160 comprises a left transmission system 160a and a right system 160b mounted to frame 12 in a conventional manner. The left and right transmission systems 160a and 160b are identical, each comprising a housing 173 for a transmission 172 that is coupled to an axle 175 for the respective left and right rear wheels 18 and 20 of mower 10. In one embodiment, transmission systems 160a, 160b are hydrostatic transmission systems made and sold by Hydro-Gear® as model number 310-2400 IZT. Transmission systems 160a, 160b are driven by a fluid pump driven by engine 14 of mower 10 in a manner known in the art. The rate of speed of the hydrostatic transmission (and thus the rate at which wheels 18 and 20 rotate) is a function of the rate at which fluid is pumped through the transmission.

The fluid pumping rate of transmission 172 is varied by rotation of a shaft 178, which is a transmission speed input extending rearward from the housing 173 of transmission 172. Shaft 178 is mounted to a top plate 174 that has an arm 179 for attachment to the left transmission engagement cable 164. As shown in FIG. 8, top plate 174 is in a neutral position. A clockwise rotation of top plate 174 from the neutral position results in an increase in the fluid pumping rate in a first direction and thus the rate at which wheels 18 and 20 rotate to drive mower 10 in a forward direction. Conversely, a counter-clockwise rotation of top plate 174 from the neutral position causes an increase in the fluid pumping rate in an opposite direction, which drives wheels 18 and 20 in reverse direction. Top plate 174 is rotatably connected to a guide plate 176, which includes a guide slot 177 for fingers attached to top plate 174 at locations 174a and is secured to transmission housing 173 via a fixed bolt 180, extending rearwardly from guide plate 176 through a window 182 formed in top plate 174. The fixed bolt 180 defines a stop that engages the ends 182a, 182b of window 182 and thereby restricts the rotation of top plate 174.

When left transmission engagement cable 164 retracts (i.e. shortens) into the cable housing, the upward motion, as illustrated by arrows Y and Z, rotates top plate 174 and shaft 178 in a clockwise direction, as illustrated by arrows AA and AB. Top plate 174 may rotate until the left end 182a of window 182 contacts bolt 180. The rotation of shaft 178 increases the pump speed of hydrostatic transmission 172, which correspondingly increases the speed of left rear wheel 18. As such, the more left transmission engagement cable 164 is pulled upward, the faster hydrostatic transmission 172 drive left rear wheel 18. Conversely, if left transmission engagement cable 164 is extended (i.e., lengthened) from the cable housing, top plate 174 will rotate counterclockwise, causing hydrostatic transmission 172 to slow left rear wheel 18 down. If transmission engagement cable 164 is fully extended, top plate 174 will rotate counter-clockwise from the neutral position illustrated in FIG. 8, causing hydrostatic transmission 172 to drive left rear wheel 18 in reverse.

Figure 9:
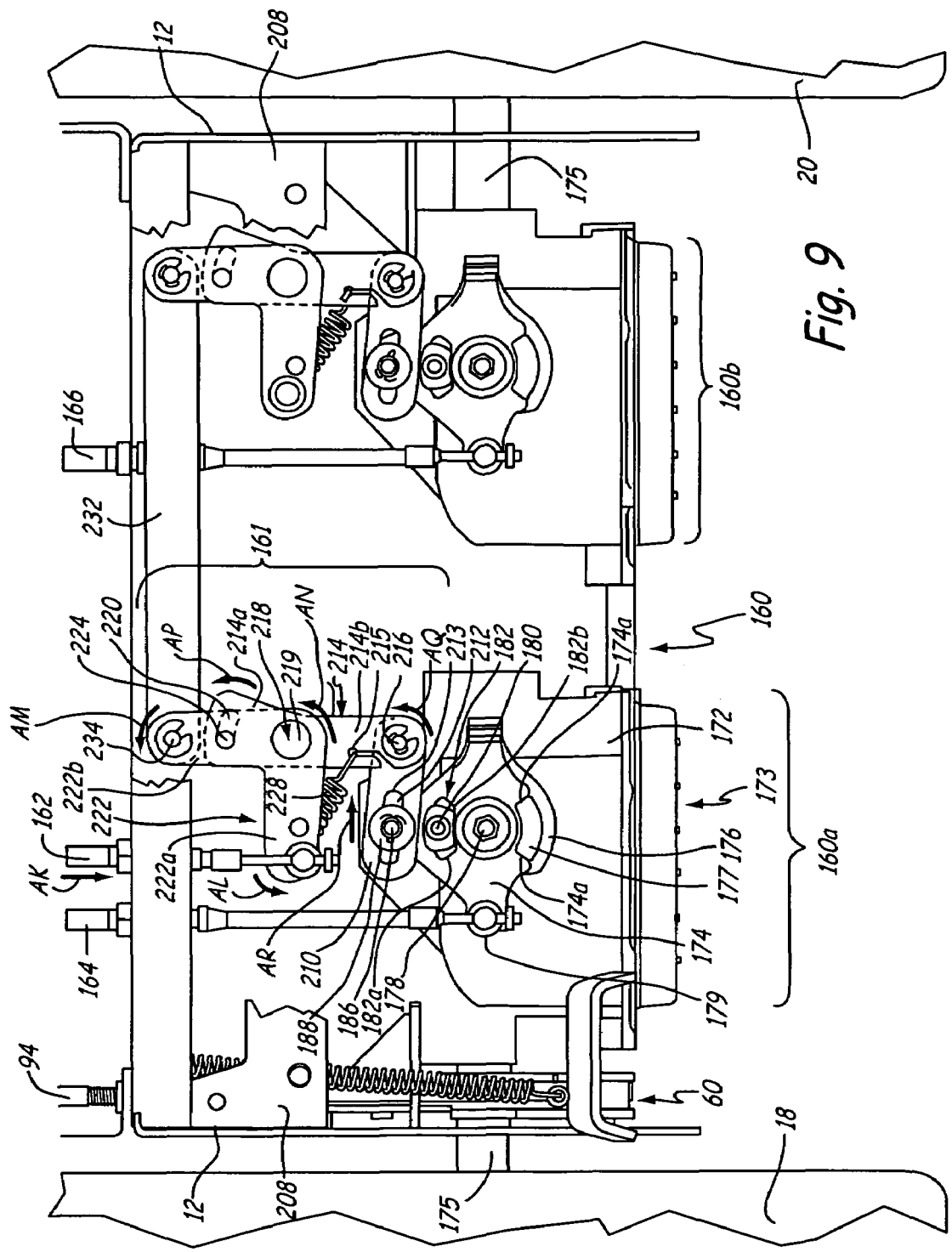
FIG. 9 is an enlarged rear view of mower 10 of the present invention.

FIG. 9 is also an enlarged rear view of mower 10 with a portion of mounting bracket 208 removed to show transmission setting system 161. Transmission setting system 161 allows the operator to select a desired transmission speed for operating rear wheels 18 and 20. The transmission setting system 161, comprises V-shaped arm 222, with a first portion 222a, a second portion 222b, and an apex 218 that is pivotally mounted to a mounting bracket 208 secured to frame 12 (shown in FIG. 8). The first portion 222a of V-shaped arm 222 connects to the transmission setting cable 162, which rotates the V-shaped arm about pivotal connection point 219 of apex 218 by extending or retracting the cable from the cable housing. The second portion 222b of V-shaped arm 222 is connected about pivotal connection 234 to a master-slave shaft 232 that in turn connects to the second portion of the V-shaped arm associated with the right transmission system 160b. Second portion 222b of V-shaped arm 222 also includes a peg 224, which extends into a slot 220 of a first portion 214a of arm member 214.

Arm member 214 is also pivotally connected to mounting bracket 208 at point 219 and further includes a second portion 214b with a slit 215, which is connected to spring 228. Second portion 214b is connected about a pivotal connection 216 to slot member 210. Spring 228 is pre-biased and provides a resistance to movement of second portion 214b of arm member 214 in a counterclockwise direction around point 219. Slot member 210 includes a horizontally longitudinal slot 212'. A pin 186, connected to top plate 174 extends through slot 212 and is retained by a connector 188. Slot 212 provides a range of travel for pin 186 as top plate 174 rotates clockwise and counterclockwise, with end 213 of slot 212 defining a stop surface for pin 186. Slot member 210 thus serves as a means for setting a desired transmission speed by restricting the rotation of top plate 174 and shaft 178 according to the position of end 213 of slot 212 relative to pin 186.

For example, slot member 210 can be set so that when top plate 174 is rotated clockwise, pin 186 will contact the end 213 of slot 212 before bolt 180 contacts window portion 182a of top plate 174. Pin 186 encounters resistance at this point due to the connection of spring 228 to arm member 214 and slot plate 210 in a countering direction. The resistance hinders top plate 174 from being further rotated clockwise and determines the first selected rate at which hydrostatic transmission 172 will be driven. The setting for the first selected transmission rate is controlled by the position of transmission control setting 168, which actuates the transmission setting cable 162.

When transmission setting cable 162 is extended (i.e., lengthened) from the cable housing, the downward motion, as illustrated by arrow AK, pivots V-shaped member 222 in a counter-clockwise direction around point 219, as illustrated by arrows AL, AM, and AN. When peg 224 reaches the end of slot 220, arm member 214 is urged to pivot counterclockwise around point 219, as illustrated by arrows AP and AQ, exceeding the countering force of spring 228, and pulling slot member 210 to the right, as illustrated by arrow AR. This increases the distance of end 213 of slot 212 from pin 186 and thus allows a greater range of rotation by top plate 174 before pin 186 contacts end 213 of slot 212 and encounters resistance from spring 228. The greater range of rotation of top plate 174 and shaft 178 allows left hydrostatic transmission 172 to drive left rear wheel 18 at a higher first selected transmission rate. As such, the extending and retracting of transmission setting cable 162 varies the position of slot member 210 and hence the first selected rate of transmission 172 for left rear wheel 18. The right transmission 172 operates in the same manner.

Figure 10:
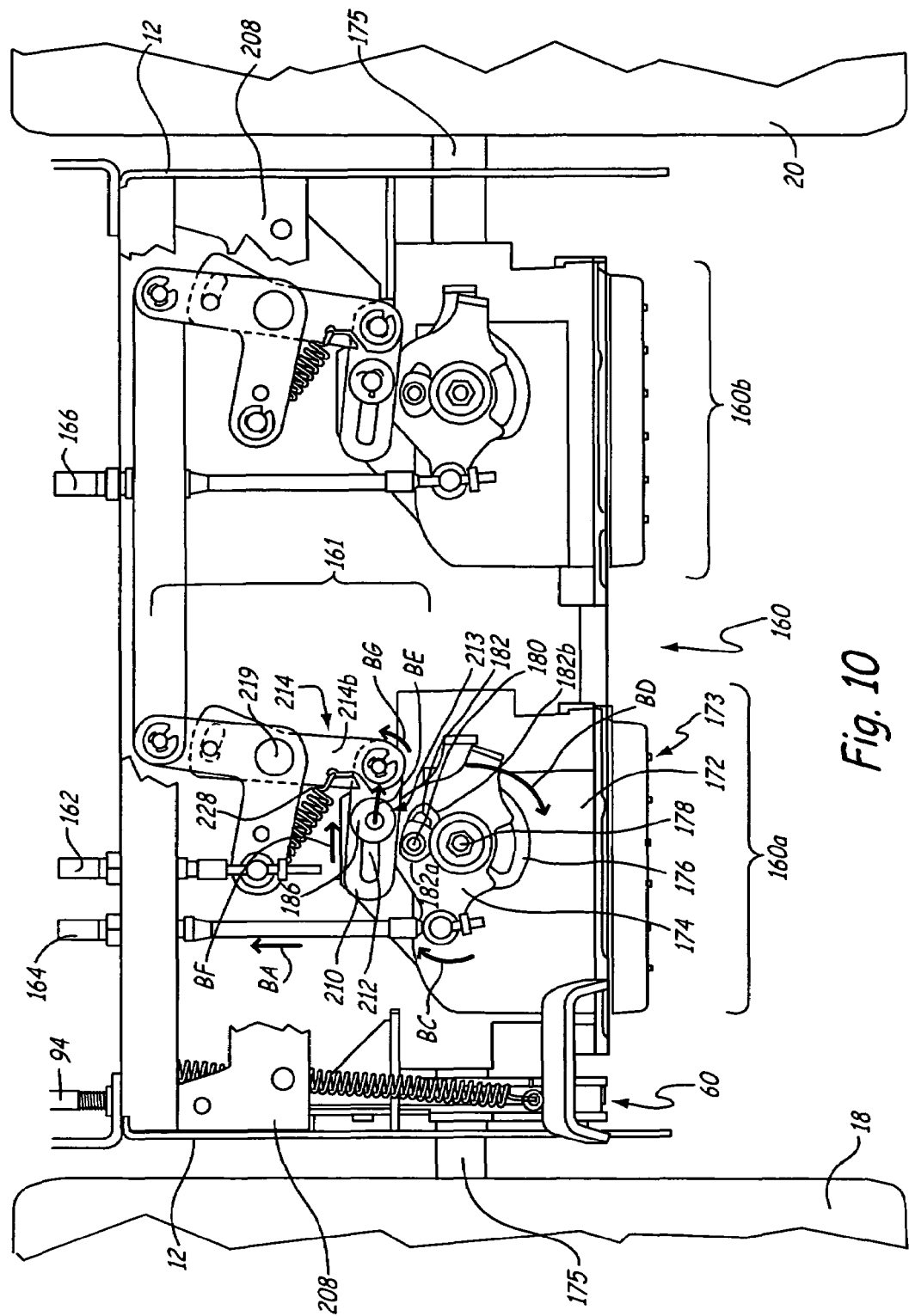
FIG. 10 is an enlarged rear view of mower 10 of the present invention.

FIG. 10 is enlarged rear view of mower 10, focusing on the component interactions for exceeding the first selected rate of transmission 172 to achieve a second higher transmission speed. As illustrated in FIG. 10, top plate 174 is rotated such that pin 186 is contacting the end 213 of slot 212. This corresponds to left rear wheel 18 operating at the first selected rate designated by transmission setting cable 162, as described in FIG. 9. At this position, top plate 174 encounters resistance from spring 228, hindering further clockwise rotation of top plate 174 and shaft 178.

To obtain a second higher transmission speed, left transmission engagement cable 164 is further retracted into the cable housing, as illustrated by arrow BA by applying a force to cable 164 that exceeds the biasing force of spring 228. This causes top plate 174 and shaft 178 to rotate further clockwise, as illustrated by arrows BC and BD, and urge pin 186 further to the right, as illustrated by arrow BE. Pin 186 drives slot plate 210 to the right, as illustrated by arrow BF, pivoting the second portion 214b of arm member 214 counterclockwise, as illustrated by arrow BG, against the biasing force of spring 228. By exceeding the biasing force of spring 228, top plate 174 and shaft 178 are able to fully rotate until bolt 180 contacts the left portion 182a of slot 182, allowing left hydrostatic transmission 172 to pump at a maximum rate.

This system allows the operator to drive left rear wheel 18 at full speed without having to stop mower 10 and adjust transmission setting cable 162. To return to the first selected rate, the left transmission engagement cable 164 is lengthened until pin 186 no longer urges slot plate 210 to the right. The interactions described above apply in the same manner to the components of hydrostatic transmission system 160b. As such, transmission system 160 allows the operator to override the first selected rate of rear wheels 18 and 20, individually or simultaneously, to reach the second higher rate.

While the present invention has been described relative to independent hydrostatic transmission systems, it is to be understood that the lever actuated drive control system described can be utilized with any transmission that includes or can be adapted to operate by a rotary transmission speed input, i.e., like shaft 178.

Figure 10A:
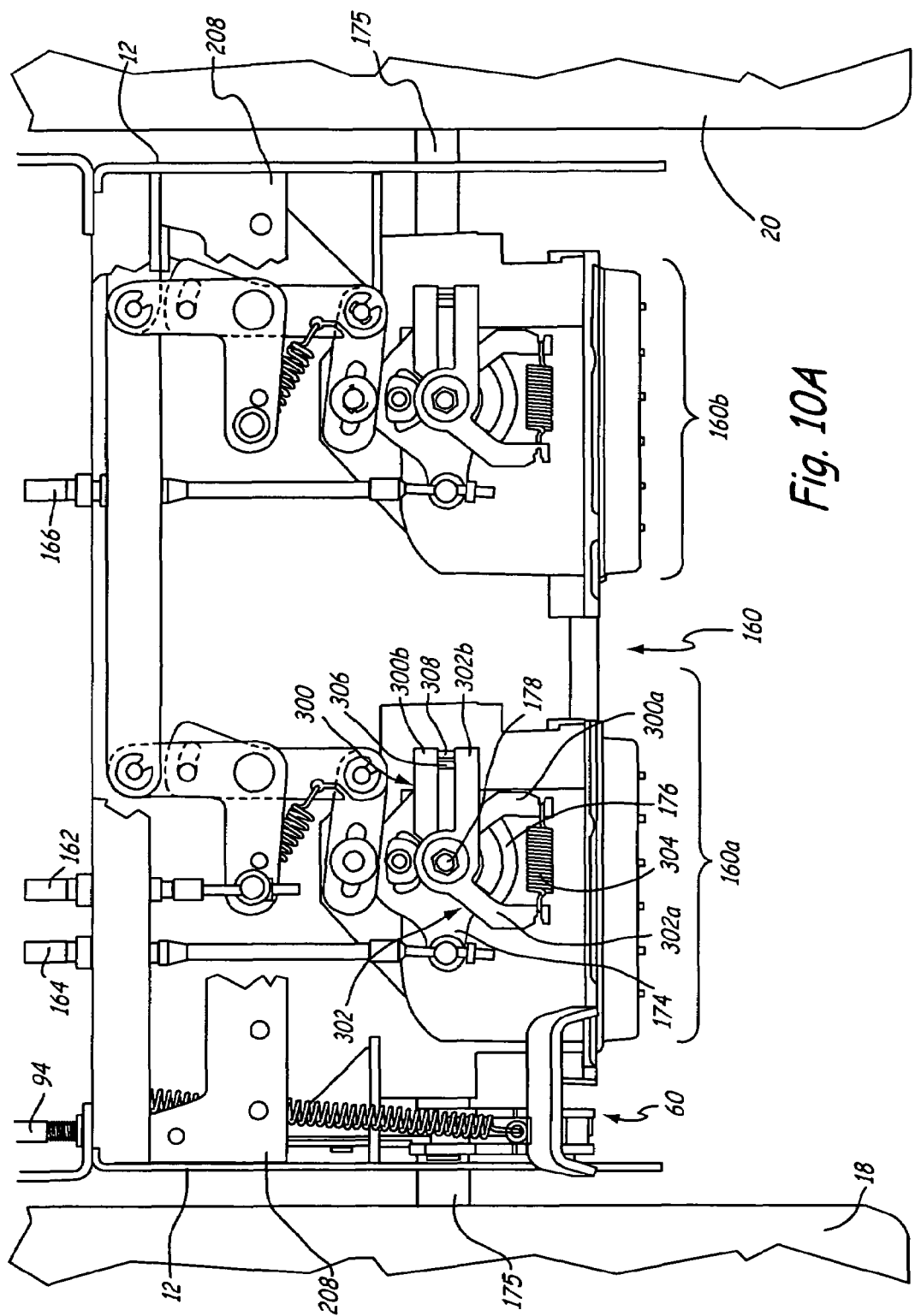
FIG. 10A is an enlarged rear view an alternative embodiment of mower 10 of the present invention.

FIG. 10A is an enlarged view of mower 10, illustrating an alternative embodiment for use with top plate 174. After exiting top plate 174, shaft 178 further extends rearward through first member 300 and second member 302, allowing both first and second members 300, 302 to rotate with top plate 174. First member 300 includes a first portion 300*a* and a second portion 300*b* that is formed at an angle relative to the first portion 300*a*. Second member 302 includes a first portion 302*a* and a second portion 302*b* that is formed at an angle relative to the first portion 302*a*. The first portion 300*a* of first member 300 is spaced from the first portion 302*a* of second member 302 with the ends of the first portion 300*a* and first portion 302*a* interconnected by a spring 304. The second portion 300*b* of first member 300 and the second portion 302*b* of second member 302 are spaced apart and are generally parallel to one another. Extending between second members 300*b* and 302*b* is a shoulder 308 that is fixed to and extends rearward from guide plate 176.

Shoulder 308 bears against second portion 300*b* of first member 300 to prevent it from rotating clockwise. Shoulder 308 also bears against the second portion 302*b* of second member 302 to prevent it from rotating counterclockwise. Also extending rearwardly from top plate 174 is an arm 306 adjacent to shoulder 308. When top plate 174 rotates clockwise, arm 306 engages the second portion 302*b* of second member 302 to rotate it clockwise with top plate 174. Similarly, when top plate 174 rotates counterclockwise, arm 306 engages the second portion 300*b* of first member 300 to rotate it counterclockwise with top plate 174.

As previously mentioned, second portions 300*b* and 302*b* are interconnected by spring 304 for assisting top plate 174 to return to the neutral position, as illustrated in FIG. 10A.

Figure 11:
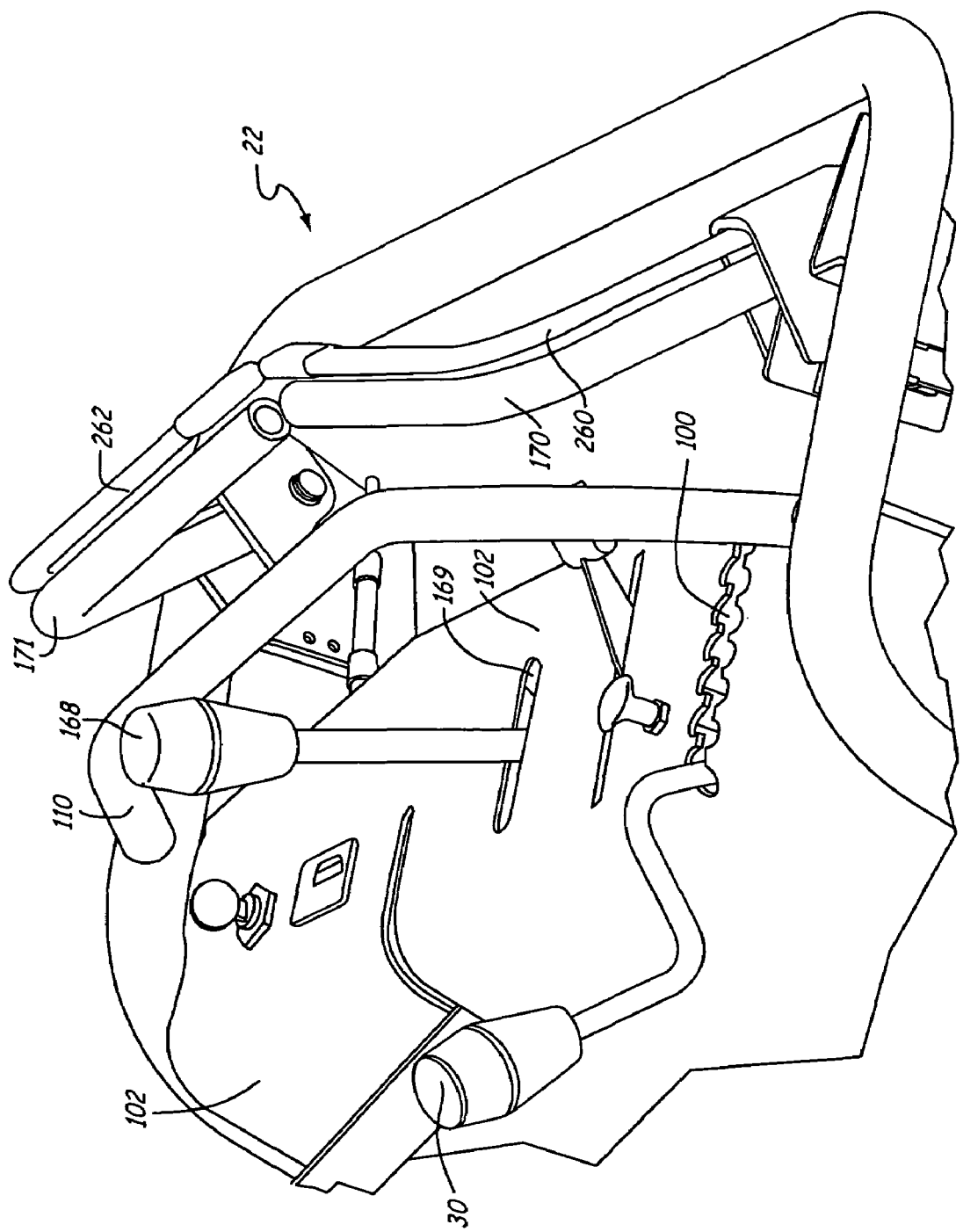
FIG. 11 is an enlarged view of the handle of the present invention.

FIG. 11 is an enlarged view of handle 22 illustrating the controls relating to transmission system 160. Transmission setting control 168 extends through a slot 169 in panel 102 for designating the first selected rate for rotating rear wheels 18 and 20. When transmission setting control 168 is shifted toward the front of mower 10, transmission setting cable 162 is lengthened, as described above in FIG. 9. Similarly, when transmission setting control 168 is shifted toward the rear of mower 10, transmission setting cable 162 is retracted from the cable housing.

In one embodiment, left and right transmission engagement levers 170, 171 are pivotally mounted to handle 22 and independently govern hydrostatic transmission systems 160*a* and 160*b*, respectively. When left transmission engagement lever 170 is moved toward cross bar 110 or pulled toward the rear of mower 10, left transmission engagement cable 164 is retracted and lengthened, respectively. Right transmission engagement lever 171 interacts with right transmission engagement cable 166 in the same manner.

Levers 260 and 262 extend alongside left and right transmission engagement levers 170, 171, respectively. Levers 260 and 262 provide operator presence controls for mower 10, as required by governmental regulations to protect operators. While at least one of levers 260 and 262 are squeezed against their corresponding engagement lever 170, 171, mower 10 may be operated. If both levers 260, 262 are released, then engine 14 of mower 10 is shut off, as is standard with motorized lawn mowers. When left and right transmission engagement levers 170, 171 rest in neutral positions, as shown in FIG. 1, top plates 174 of transmission system 160 is also in the neutral position previously shown in FIG. 8. Rear wheels 18 and 20 are engaged for forward rotation when left and right transmission engagement levers 170, 171 are moved toward cross bar 110. Generally, the further forward left and right transmission engagement levers 170, 171 are moved relative to crossbar 110, the faster rear wheels 18 and 20 are driven. Mower 10 travels at the first selected rate when left and right transmission engagement levers 170, 171 encounter the resistance from springs 228 of transmission setting system 161. Springs 228 hinder further forward movement of left and right transmission engagement levers 170, 171 toward cross bar 110.

The extent to which left and right transmission engagement levers 170, 171 are able to move toward cross bar 110 before encountering resistance is based upon the setting of transmission setting control 168. If, for example, transmission setting control 168 is fully shifted back toward the rear of mower 10, transmission setting cable 162 is frilly retracted, setting the first selected rate to the lowest speed in a manner described above. Left and right transmission engagement levers 170, 171 will encounter the resistance after being moved a short distance toward cross bar 110. At the point where left and right transmission engagement levers 170, 171 encounter resistance, hydrostatic transmission systems 160*a* and 160*b* drive rear wheels 18 and 20 forward, respectively, at a first selected rate.

If transmission setting control 168 is pivoted forward toward the front of mower 10, such that transmission setting control 168 is positioned at the mid-point between fully forward and fully rearward, transmission setting cable 162 will be lengthened to a midway point. This will set the first selected rate at a speed midway between full speed and the lowest speed in a manner described above. Left and right transmission engagement levers 170, 171 are capable of moving further toward cross bar 110, before encountering the resistance. As such, when left and right transmission engagement levers 170, 171 encounter the point of resistance, they hydrostatic transmission systems 160*a* and 160*b* drive rear wheels 18 and 20 forward, respectively, at a mid-speed.

Finally, if transmission setting control 168 is fully shifted toward the front of mower 10, transmission setting cable 162 will be fully lengthened, setting the first selected rate at full speed in a manner described above. Left and right transmission engagement levers 170, 171 are capable of being moved fully forward toward cross bar 110 without encountering the resistance. At the fully forward position, hydrostatic transmission systems 160*a* and 160*b* drive rear wheels 18 and 20 forward, respectively, at a first selected rate that is full speed.

With known mowers, adjustments to the transmission speed require an operator to stop the forward progression of the mower by bringing the transmission engagement levers to their neutral positions, before shifting the transmission setting control to a different rate. Only after resetting the transmission setting control can the operator then re-engage the transmissions to continue forward at the new rate. This can be time consuming and tedious, especially when a higher rate of speed is only temporarily needed to reverse the mowing direction or to move the mower to more distant areas requiring mowing. Mower 10 overcomes this limitation by being able to operate at a second higher rate without adjusting transmission setting control 168. This occurs when left and right transmission engagement levers 170, 171 are further pressed to surpass the encountered resistance. This correspondingly allows left and right transmission engagement cables 164, 166 to rotate top plates 174 further to exceed the biasing force of springs 228 in transmission system 160, respectively. This overrides transmission setting control 168 allowing mower 10 to achieve full speed, merely by adjusting the position of left and right transmission engagement levers 170, 171.

Mower 10 may also operate in reverse at a constant speed, as discussed above. This is accomplished by pulling left and right transmission engagement levers 170, 171 back from their neutral position, toward the rear portion of handle 22.

Mower 10 additionally allows an independent operation of left rear wheel 18 and right rear wheel 20. Through the use of independent hydrostatic transmissions, left rear wheel 18 may be operated at a speed differing from right rear wheel 20. The operator may independently operate left rear wheel 18 at a desired speed, regardless of how right rear wheel 20 is operated, such as during turning maneuvers.

Rapid turns of mower 10 may be accomplished by a full forward movement of left transmission engagement lever 170 and a full rearward movement of right transmission engagement lever 171. This arrangement allows left rear wheel 18 to operate, at full speed, while right rear wheel 20 operates in reverse, allowing mower 10 to take a sharp and rapid turn around an axial point of right wheel 20.

As described above, mower 10 is a walk-behind lawn mower that provides both a rapid and efficient system for adjusting the height of deck 24 and an advantageous drive system. The deck height adjustment system allows the operator to adjust the height of deck 24 without shutting down engine 14, and without having to manually adjust individual corners of deck 24, which is tedious and time consuming. The drive system allows mower 10 to be operated at the first selected rate, while also allowing mower 10 to override the first selected rate. The override allows mower 10 to reach the second higher rate without an adjustment of transmission setting control 168. This, in addition to individually driven wheels, reduces the time required to mow intended areas.

Although the present invention has been described with reference to preferred embodiments, workers skilled in the art will recognize that changes may be made in form and detail without departing from the spirit and scope of the invention. In particular, it is to be understood that the lever actuated drive control system of the present invention may be implemented in riding mowers which employ independent steering levers, in which case each steering lever serves to actuate the respective transmission system comparable to the operation described relative to levers 170, 171.

The invention claimed is:

1. A walk behind mower having an operator handle and a pair of drive wheels operably connected to an engine-driven transmission, the walk behind mower comprising:
 a lever operably connected to the handle and moveable between a starting position and a second position;
 a transmission speed input operably connected to the lever, the transmission having a rate of speed that is a function of a rotational position of the transmission speed input, wherein the transmission is in neutral when the lever is in the starting position and wherein the transmission is at a highest rate of speed when the lever is in the second position;
 a first member connected to the transmission speed input and rotatable therewith; and
 a second member having a stop surface positioned relative to the first member and operably engageable with the first member, the stop surface of the second member having a home position near the first member and being moveable away from the home position, the second member being biased toward the home position;
 wherein a first amount of force applied to the lever moves the lever away from the starting position and causes the first member to rotate and engage the stop surface before the lever reaches the second position, and wherein the lever is moveable to the second position by applying a second amount of force to the lever to cause the first member to further rotate and move the second member away from the home position.

2. The walk behind mower of claim 1 wherein the first member comprises a plate, the plate being coaxially mounted to the transmission speed input, the plate having a first radial portion operably connected to the lever and a second radial portion radially spaced from the first radial portion, the second radial portion configured to engage the stop surface of the second member.

3. The walk behind mower of claim 2 wherein the lever is operably connected to the plate by a cable.

4. The walk behind mower of claim 2 wherein the second member is configured with a slot, wherein an end of the slot defines the stop surface of the second member, and wherein the second radial portion of the plate is positioned within the slot.

5. The walk behind mower of claim 4 wherein the second member comprises a first portion and a second portion pivotally connected to an end of the first portion and extending at an angle relative to the first portion, wherein the first portion is configured with the slot and the second portion is pivotally connected to a frame member of the mower.

6. The walk behind mower of claim 5 and further comprising a spring connected between the frame member and the second portion of the second member, the spring biasing the end of the slot of the second member toward the home position.

7. The walk behind mower of claim 1 wherein the home position of the stop surface of the second member is adjustable.

8. The walk behind mower of claim 7 and further comprising a control operably connected to the handle and further operably connected to the second member, wherein the home position of the stop surface of the second member is a function of a setting of the control.

9. The walk behind mower of claim 8 and further comprising a third member having a first radially extending portion and a second radially extending portion, the second radially extending portion extending at an angle relative to the first radially extending portion, the third member pivotally connected to a frame member of the mower, wherein the first radially extending portion is operably connected to the control and wherein the second radially extending portion is operably engageable with the second member.

10. A method of operating a transmission of a motorized walk behind mower between a first selected transmission speed less than a maximum transmission speed and the maximum transmission speed, the method comprising:
 operably connecting a lever on a handle of the mower to a transmission speed input, the transmission speed input being moveable between a neutral position and a second position corresponding to the maximum transmission speed;
 operably connecting the transmission speed input to a moveable member having a stop surface; and
 biasing the moveable member in a first position with the stop surface proximate the transmission speed input;
 wherein the transmission speed input encounters the stop surface to define the first selected transmission speed when a first amount of force is applied to the lever; and
 wherein the transmission speed input moves the moveable member and reaches the second position when a second amount of force is applied to the lever.

11. The method of claim 10 and further comprising adjusting the first position of the moveable member to change a distance of the stop surface relative to a neutral position of the transmission speed input.

12. The method of claim 11 wherein the step of adjusting the first position of the moveable member comprises increasing the distance of the stop surface relative to the neutral position of the transmission speed input.

13. A walk behind mower having an operator handle and a pair of drive wheels, each drive wheel being operably connected to a first and second independent engine-driven transmission, the walk behind mower comprising:
 a pair of levers operably connected to the handle, each lever being moveable between a starting position and a second position;
 a transmission speed input associated with each of the first and second transmissions and operably connected to each of the pair of levers, the first and the second transmission each having a rate of speed that is a function of a rotational position of the transmission speed input, wherein each of the first and the second transmission is in neutral when a respective lever is in the starting position and wherein each of the first and the second transmission is at a highest rate of speed when the respective lever is in the second position;
 a first member connected to each transmission speed input of the first and second transmissions and rotatable therewith; and
 a second member associated with each of the first and second transmissions and having a stop surface positioned relative to each first member and operably engageable with the respective first member, the stop surface of the second member having a home position near the respective first member and being moveable away from the home position, the second member being biased toward the home position;
 wherein a first amount of force applied to the pair of levers moves the levers away from the starting position and causes the respective first members to rotate and engage the stop surface before the levers reach the second position, and wherein the levers are moveable to the second position by applying a second amount of force to the levers to cause the respective first members to further rotate and move the second member away from the home position.

14. The walk behind mower of claim 13 wherein the first member comprises a plate, each respective plate being coaxially mounted to the respective transmission speed input, each plate having a first radial portion operably connected to a respective one of the pair of levers and a second radial portion radially spaced from the first radial portion, the second radial portion configured to engage the stop surface of the second member.

15. The walk behind mower of claim 14 wherein each lever of the pair of levers is operably connected to the respective plate by a cable.

16. The walk behind mower of claim 15 wherein the home position of the stop surface of the second member is adjustable.

17. The walk behind mower of claim 16 and further comprising a control operably connected to the handle and further operably connected to at least one of the second members, wherein the home position of the stop surface of each second member is a function of a setting of the control.

18. The walk behind mower of claim 17 wherein each second member is configured with a slot, wherein an end of the slot defines the stop surface of the second member, and wherein the second radial portion of each plate is positioned within the respective slot.

19. The walk behind mower of claim 18 wherein each second member comprises a first portion and a second portion pivotally connected to an end of the first portion and extending at an angle relative to the first portion, wherein the first portion of each second member is configured with the respective slot and each second portion is pivotally connected to a frame member of the mower.

20. The walk behind mower of claim 19 and further comprising a linking member connected between the second portion of each second member.

21. The walk behind mower of claim 20 and further comprising a third member associated with each second member, each third member having a first radially extending portion and a second radially extending portion, the second radially extending portion extending at an angle relative to the first radially extending portion, each third member pivotally connected to a frame member of the mower, wherein the second radially extending portion of each third member is operably engageable with the respective second member and wherein the first radially extending portion of a first one of the third members is operably connected to the control.

22. The walk behind mower of claim 19 and further comprising a spring connected between the frame member and each second portion of the respective second member, each spring biasing the end of the respective slot of the second member toward the home position.

* * * * *